US012800395B2

(12) United States Patent
Matsuoka et al.

(10) Patent No.: US 12,800,395 B2
(45) Date of Patent: Nov. 17, 2026

(54) INFRARED SENSOR MODULE

(71) Applicant: Asahi Kasei Microdevices Corporation, Tokyo (JP)

(72) Inventors: Go Matsuoka, Tokyo (JP); Seiichi Tokuo, Tokyo (JP)

(73) Assignee: Asahi Kasei Microdevices Corporation, Tokyo (JP)

(*) Notice: Subject to any disclaimer, the term of this patent is extended or adjusted under 35 U.S.C. 154(b) by 281 days.

(21) Appl. No.: 18/590,938

(22) Filed: Feb. 29, 2024

(65) Prior Publication Data

US 2024/0328860 A1 Oct. 3, 2024

(30) Foreign Application Priority Data

Mar. 27, 2023 (JP) ................................ 2023-050573

(51) Int. Cl.
*G01J 5/00* (2022.01)
*G01J 5/02* (2022.01)

(52) U.S. Cl.
CPC ...................................... *G01J 5/02* (2013.01)

(58) Field of Classification Search
CPC ...... G01J 5/02; G01J 5/00; G01J 5/027; G01J 5/06; G01J 5/20; G01J 5/045; G01J 5/046; G01J 5/07
See application file for complete search history.

(56) References Cited

U.S. PATENT DOCUMENTS

2008/0179503 A1 7/2008 Camargo et al.
2009/0166784 A1 7/2009 Honda
2013/0093037 A1 4/2013 Kirihara et al.
2015/0362365 A1* 12/2015 Fukunaka ................. G01J 3/12 250/339.01
2020/0027916 A1* 1/2020 Wang .................. H10F 39/8067
2022/0093523 A1 3/2022 Shanmugam et al.

FOREIGN PATENT DOCUMENTS

EP 4258355 A1 10/2023
JP H05264341 A 10/1993
JP 2012215432 A 11/2012
JP 2015083995 A 4/2015
JP 6039789 B2 12/2016
JP 2018018975 A 2/2018
KR 1020130031342 A 3/2013
WO 2006095834 A1 9/2006
WO 2008032404 A1 3/2008
WO 2011117947 A1 9/2011
WO 2022118535 A1 6/2022

* cited by examiner

*Primary Examiner* — Uzma Alam
*Assistant Examiner* — Mamadou Faye
(74) *Attorney, Agent, or Firm* — KENJA IP LAW PC

(57) ABSTRACT

This infrared sensor module is compact and capable of highly accurate infrared detection. The infrared sensor module (10) includes a quantum infrared sensor (11) configured to detect light in an infrared region, a signal processor (21) electrically connected to the quantum infrared sensor, a thermal conductor (15) in contact with the signal processor and disposed at a different position than the quantum infrared sensor in plan view, and a seal (14) configured to seal the quantum infrared sensor, the signal processor, and the thermal conductor integrally. A light-receiving surface of the quantum infrared sensor and a portion of the thermal conductor are exposed from the seal, and the thermal conductor is configured by a material with higher thermal conductivity than resin.

8 Claims, 3 Drawing Sheets

INFRARED SENSOR MODULE

CROSS-REFERENCE TO RELATED APPLICATION

The present application claims priority to Japanese Patent Application No. 2023-050573 filed on Mar. 27, 2023, the entire contents of which are incorporated herein by reference.

TECHNICAL FIELD

The present disclosure relates to an infrared sensor module.

BACKGROUND

In general, infrared sensors are used for various applications, such as non-contact detection of the surface temperature of objects, detection of the presence of objects, and measurement of gas concentration in the atmosphere. For example, in order to accurately detect surface temperature in a non-contact manner, it is important to limit the viewing angle of the infrared sensor so that it does not receive infrared radiation emitted from an object other than the object to be measured. For example, Patent Literature (PTL) 1 discloses an infrared sensor that has a field of view limiting portion, in sealing resin, formed in an inverse taper shape that becomes wider from an entrance position of infrared radiation toward a light-receiving surface.

CITATION LIST

Patent Literature

PTL 1: JP 2015-083995 A

SUMMARY

Here, in the detection of infrared radiation by infrared sensors, thermal isolation from the outside is important, as is thermal coupling with optical members used together (such as a field of view limiting portion) to reduce the effects of radiation. Infrared sensors are sometimes provided as an infrared sensor module integrated with a signal processor that processes a detection signal to calculate a measured value (such as the surface temperature of an object or gas concentration). PTL 1 does not disclose the configuration of an infrared sensor in the case of integration with a signal processor.

Thermal coupling with optical members and the like used together with an infrared sensor is also important in infrared sensor modules. Conventionally, as illustrated in FIG. 3, for example, a metal layer is provided on a substrate to surround the field of view limiting portion in plan view and increase thermal conduction between the infrared sensor and the optical member. However, in a conventional configuration, the optical member (the field of view limiting portion in FIG. 3) and the metal layer need to be placed in contact outside a large signal processor, making it difficult to reduce the infrared sensor module in size.

It would be helpful to provide an infrared sensor module that is compact and capable of highly accurate infrared detection.

(1) An infrared sensor module according to an embodiment of the present disclosure includes:

a quantum infrared sensor configured to detect light in an infrared region;

a signal processor electrically connected to the quantum infrared sensor;

a thermal conductor in contact with the signal processor and disposed at a different position than the quantum infrared sensor in plan view; and a seal configured to seal the quantum infrared sensor, the signal processor, and the thermal conductor integrally, wherein a light-receiving surface of the quantum infrared sensor and a portion of the thermal conductor are exposed from the seal, and the thermal conductor is configured by a material with higher thermal conductivity than resin.

(2) In an embodiment of the present disclosure, (1) further includes an optical member disposed in contact with the portion of the thermal conductor exposed from the seal.

(3) In an embodiment of the present disclosure, in (2), the optical member is a field of view limiting portion that limits a field of view of the light-receiving surface.

(4) In an embodiment of the present disclosure, in any one of (1) to (3), the signal processor and the thermal conductor have a thermal expansion coefficient of $2\times10^{-6}$/K to $10\times10^{-6}$/K.

(5) In an embodiment of the present disclosure, in any one of (1) to (4), the quantum infrared sensor and the thermal conductor are disposed above a main surface of the signal processor.

(6) In an embodiment of the present disclosure, in any one of (1) to (5), the light-receiving surface of the quantum infrared sensor and the portion of the thermal conductor are exposed from an identical surface of the seal.

According to the present disclosure, an infrared sensor module that is compact and capable of highly accurate infrared detection can be provided.

DETAILED DESCRIPTION

Figure 1:
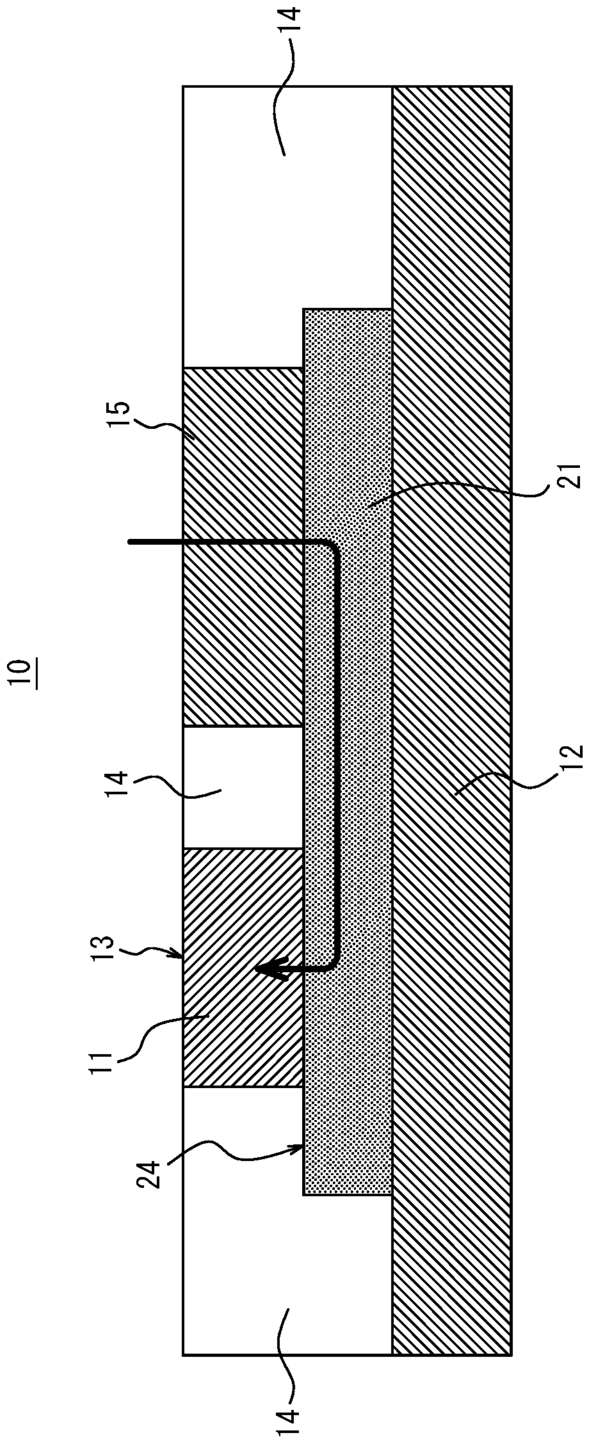
FIG. 1 is a diagram illustrating an example configuration of an infrared sensor module according to an embodiment of the present disclosure.

An infrared sensor module according to an embodiment of the present disclosure is described below with reference to the drawings. Parts in the drawings that are the same or correspond are allotted the same reference signs. In the description of the present embodiment, descriptions of parts that are the same or correspond may be omitted or abbreviated as appropriate.

(Infrared Sensor Module)

FIG. 1 illustrates a configuration of an infrared sensor module 10 according to the present embodiment. The infrared sensor module 10 includes a quantum infrared sensor 11, a signal processor 21, a thermal conductor 15, and a seal 14. FIG. 1 is a cross-sectional view illustrating a cross-section of the infrared sensor module 10 including these constituent elements. The constituent elements are described in detail further below. In the present embodiment, the infrared sensor module 10 further includes a substrate 12. The substrate 12 may, for example, be a rewiring substrate that connects the input and output of the signal processor 21 to the inputs and outputs of the package. The substrate 12 may, for example, be formed from Si or GaAs.

In the present embodiment, the infrared sensor module 10 is used as a component of a non-contact temperature measurement apparatus that measures the temperature of a measurement target in a non-contact manner. The infrared sensor module 10 detects the amount of infrared energy (infrared amount) incident from the measurement target using the quantum infrared sensor 11, and the temperature of the measurement target is calculated based on the infrared amount detected by the signal processor 21. Here, the infrared sensor module 10 is not limited to use in a specific application. As another example, the infrared sensor module 10 may be used as a component of a NDIR (Non-Dispersive InfraRed) type gas sensor that measures the concentration of gases such as carbon dioxide. The NDIR gas sensor measures the concentration of the detected gas by detecting the amount of absorbed infrared radiation, utilizing the fact that the wavelength of infrared radiation that is absorbed differs depending on the type of gas. The infrared sensor module 10 may, for example, be used in moisture meters and flame detectors.

(Quantum Infrared Sensor)

The quantum infrared sensor 11 is a sensor that detects light in the infrared region (infrared light) using electrons or holes generated by light quanta when a semiconductor is irradiated with infrared light. The quantum infrared sensor 11 is more sensitive and has a faster response time than a thermal infrared sensor. The quantum infrared sensor 11 outputs a signal corresponding to the amount of infrared light received. The output signal may, for example, be a current value. The reception wavelength of the quantum infrared sensor 11 may be 2 μm to 12 μm. To achieve further miniaturization, the quantum infrared sensor 11 may include materials such as InSb, InGaAs, InAs, AlInSb, or InAsSb, for example, but the materials of the quantum infrared sensor 11 are not limited to any particular materials. However, the quantum infrared sensor 11 preferably contains at least one of indium and gallium and at least one of arsenic and antimony as materials and preferably has a diode structure consisting of at least two types of layers, i.e., P-type semiconductor and N-type semiconductor layers.

(Signal Processor)

The signal processor 21 acquires signals corresponding to the infrared amount detected by the quantum infrared sensor 11 and calculates the temperature of the measurement target. The signal processor 21 may also control operations such as the timing of the detection by the quantum infrared sensor 11. The signal processor 21 may include at least one of a general purpose processor that performs functions according to programs that are read and a dedicated processor specialized for particular processing. The dedicated processor may include an application specific integrated circuit (ASIC).

In the present embodiment, the signal processor 21 is configured by an ASIC and is larger in size than the quantum infrared sensor 11. The signal processor 21 is electrically connected to the quantum infrared sensor 11. In other words, the signal processor 21 is connected to the quantum infrared sensor 11 by metal wiring. The connection is not limited to a specific method. For example, a lead frame may be used. The thermal conductivity between the signal processor 21 and the quantum infrared sensor 11 is high.

(Seal)

The seal 14 is made of a resin material and integrally seals the quantum infrared sensor 11, the signal processor 21, and the thermal conductor 15. The seal 14 is resin, for example, and may be formed from a resin material such as epoxy resin. Besides a resin material such as epoxy resin, the material forming the seal 14 may contain a filler, impurities that are unavoidably mixed in, and so forth. Silica or the like, for example, may suitably be used as the filler. The resin of the seal 14 has a low thermal conductivity of approximately 0.3 to 4 W/m. K and can thermally isolate the quantum infrared sensor 11 from regions such as the space outside the infrared sensor module 10. In the example configuration of the quantum infrared sensor 11 illustrated in FIG. 1, the effect of thermal isolation of the quantum infrared sensor 11 from the outside can be further enhanced by use of a material with low thermal conductivity for the substrate 12 as well. Here, a light-receiving surface 13 of the quantum infrared sensor 11 and a portion of the thermal conductor 15 are exposed from the seal 14. In the example in FIG. 1, the light-receiving surface 13 and the portion of the thermal conductor 15 are exposed from an identical surface (top surface) of the seal 14.

(Thermal Conductor)

The thermal conductor 15 is configured by a material with higher thermal conductivity than resin. The thermal conductor 15 may, for example, be configured by a metal, a representative example being aluminum with a high thermal conductivity of approximately 200 W/m·K, a metal-plated resin, or a semiconductor material, a representative example being Si with a thermal conductivity of approximately 150 W/m·K. The thermal conductor 15 may be also an integrated circuit different from the signal processor 21, such as a memory chip, for example. Furthermore, the quantum infrared sensor 11 may be shared with the thermal conductor 15, i.e., the quantum infrared sensor 11 may function as the thermal conductor 15. The thermal conductor 15 is disposed in contact with the signal processor 21. Therefore, a path with high thermal conductivity is formed, as indicated by the arrow in FIG. 1. Here, contact between the thermal conductor 15 and the signal processor 21 includes not only direct contact, but also a state in which thermal conduction is not inhibited as a result of a thermally conducting member being placed between the thermal conductor 15 and the signal processor 21. In other words, contact includes not only physical (direct) contact between the thermal conductor 15 and the signal processor 21, but also other forms of contact, such as contact via adhesive or grease, for example. To ensure the stability of the junction, the thermal expansion coefficients of the thermal conductor 15 and the signal processor 21 are preferably close, and from this perspective, the two components are preferably configured by the same material, such as Si (thermal expansion coefficient (hereinafter only the value is indicated) of $4\times10^{-6}$/K) or GaAs ($5.4\times10^{-6}$/K). Alternatively, materials with thermal expansion coefficients close to those of Si or GaAs, such as Si, GaAs, alumina ($8\times10^{-6}$/K), or silicon carbide ($4.8\times10^{-6}$/K), are preferred. The thermal expansion coefficients of the signal processor 21 and the thermal conductor 15 are, for example, from $2\times10^{-6}$/K to $10\times10^{-6}$/K. As illustrated in FIG. 1, the thermal conductor 15 is disposed at a different position than the quantum infrared sensor 11 in plan view. Here, plan view refers to viewing the infrared sensor module 10 from above in the stacking direction in which the signal processor 21, the thermal conductor 15, and the like are stacked on top of the substrate 12.

Figure 2:
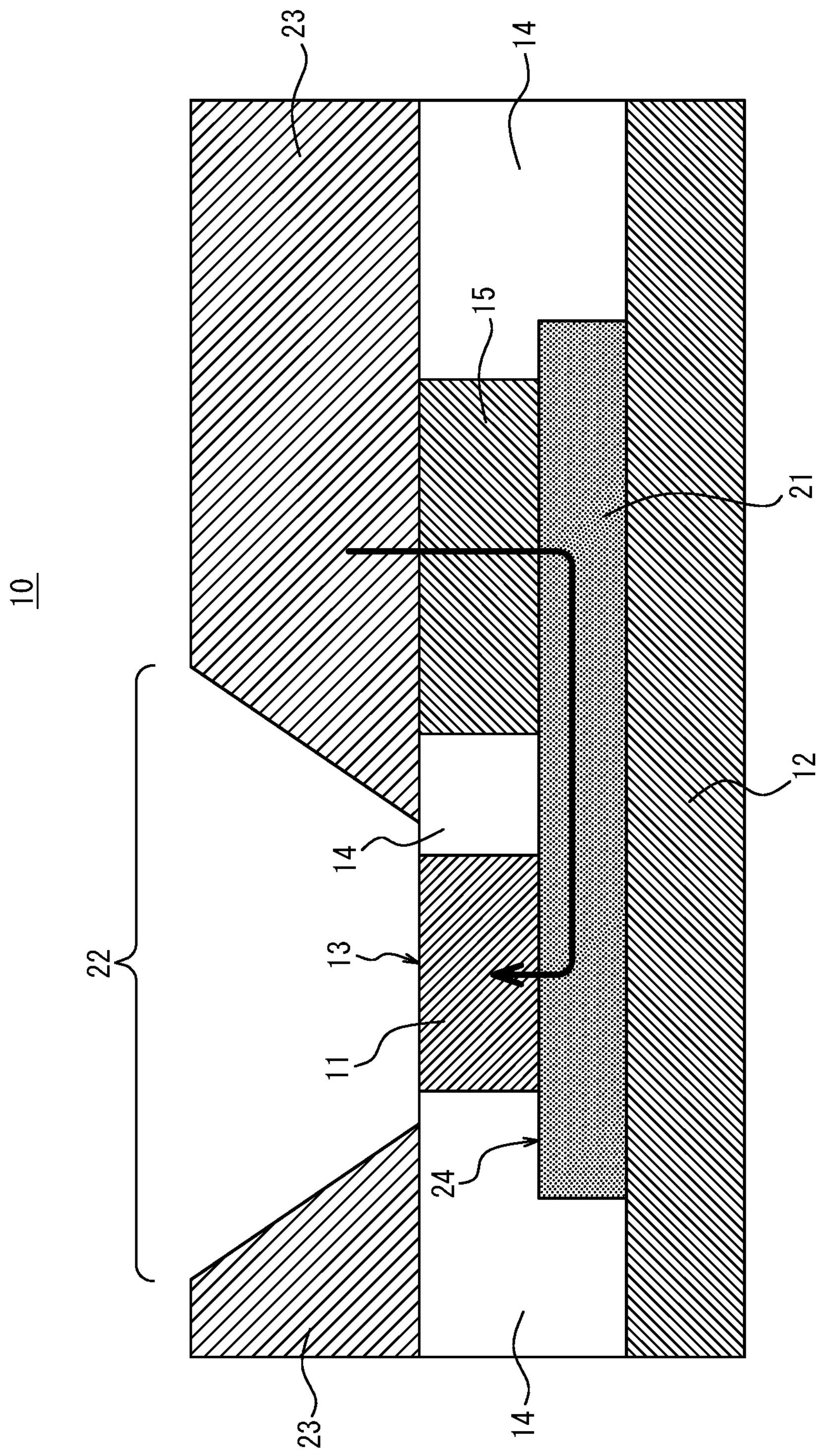
FIG. 2 is a diagram illustrating an example configuration of an infrared sensor module that includes a field of view limiting portion.

Here, the infrared sensor module 10 may be configured to further include an optical member 23 according to the application. In the present embodiment, a field of view limiting portion is used as the optical member 23 so that infrared radiation emitted from an object other than the object to be measured is not received. The field of view limiting portion limits the field of view, in particular the viewing angle, of the light-receiving surface 13. FIG. 2 is a diagram illustrating an example configuration of the infrared sensor module 10 including the field of view limiting portion. The field of view limiting portion is configured by a material (such as resin or metal) that does not transmit infrared radiation and has an opening 22 formed in a tapered shape at the portion of the light-receiving surface 13. When the infrared sensor module 10 is used as a component of an NDIR gas sensor, for example, the optical member 23 can be a mirror, a lens, an optical filter, or the like. As mentioned above, thermal coupling with the optical member 23 is important for the quantum infrared sensor 11 to detect infrared radiation with high accuracy. In the configuration of the infrared sensor module 10 according to the present embodiment, a path of high thermal conductivity is formed via the thermal conductor 15 and the signal processor 21. Therefore, the optical member 23 can be thermally coupled to the quantum infrared sensor 11 and the optical member 23 by placing the optical member 23 in contact with the portion of the thermal conductor 15 exposed from the seal 14. Here, contact between the optical member 23 and the thermal conductor 15 includes not only direct contact, but also a state in which thermal conduction is not inhibited as a result of a thermally conducting member being placed between the optical member 23 and the thermal conductor 15. In other words, contact includes not only physical (direct) contact between the optical member 23 and the thermal conductor 15, but also other forms of contact, such as contact via adhesive or grease, for example. Contact between the optical member 23 and the thermal conductor 15 includes the case of connection via a protective layer that is formed on the exposed portion of the thermal conductor 15 and does not inhibit thermal conduction.

For example, if the infrared sensor module 10 were not to include the thermal conductor 15, the resin of the seal 14 would also be disposed in the area where the thermal conductor 15 is indicated in FIG. 2. In this case, a path of high thermal conductivity would not be formed, and radiation would occur at the contact surface between the seal 14 and the optical member 23. Due to the effect of radiation, the quantum infrared sensor 11 would receive infrared radiation emitted from objects other than the object to be measured, resulting in reduced measurement accuracy. The infrared sensor module 10 according to the present embodiment is free from such radiation effects and thus enables highly accurate infrared detection.

Figure 3:
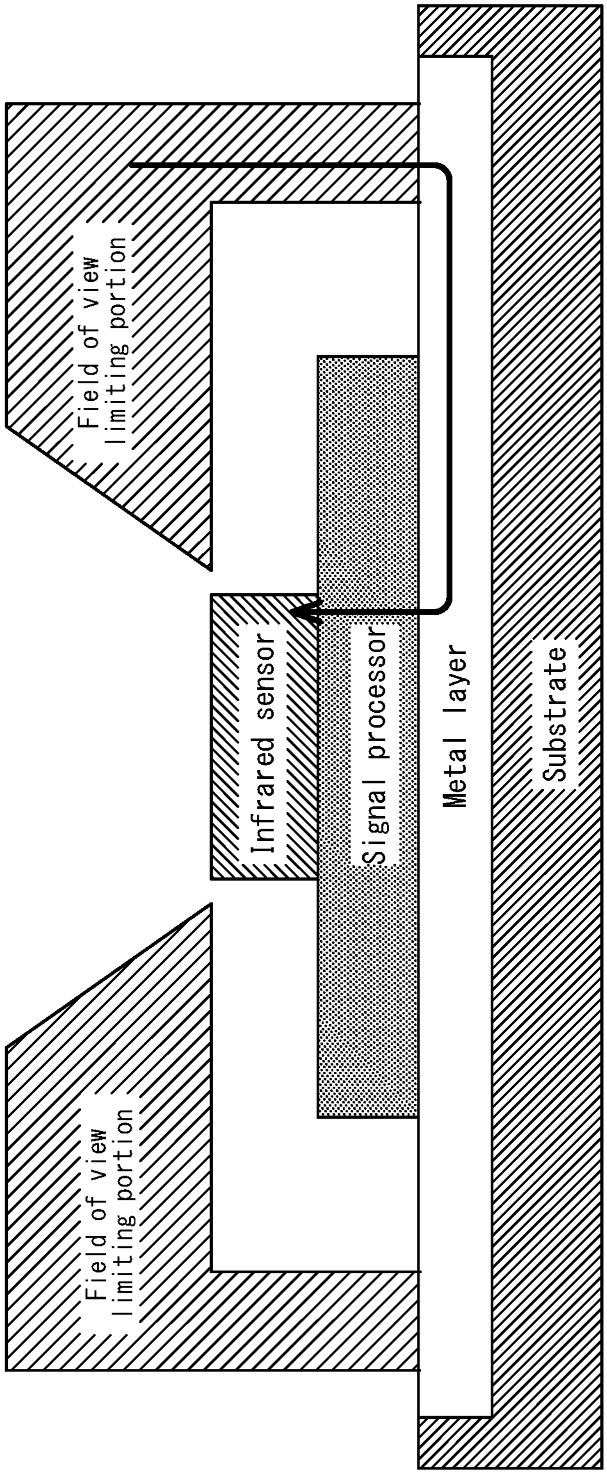
FIG. 3 is a diagram illustrating an example of a conventional configuration of an infrared sensor module.

In the infrared sensor module 10 according to the present embodiment, the optical member 23 can be arranged so as to be stacked on the seal 14. Accordingly, there is no need to place the optical member 23 and a metal layer in contact outside the signal processor 21, as in the conventional configuration in FIG. 3. The infrared sensor module 10 according to the present embodiment can therefore be reduced in size. In particular, as illustrated in FIG. 2, a configuration in which the quantum infrared sensor 11 and the thermal conductor 15 are disposed on a main surface 24 of the signal processor 21 also achieves a reduction in size in the width direction (left-right direction), enhancing the size reduction effect. Here, the main surface 24 is the surface with the largest area among the surfaces of the signal processor 21 and is the surface farthest from the substrate 12.

As described above, the infrared sensor module 10 according to the present embodiment is compact and capable of highly accurate infrared detection as a result of the aforementioned configuration.

Although an embodiment of the present disclosure has been described based on the various drawings and examples, it should be noted that a person of ordinary skill in the art could easily make various modifications and revisions based on the present disclosure. Accordingly, such modifications and revisions should also be considered to be included within the scope of the present disclosure.

The invention claimed is:

1. An infrared sensor module comprising:

a quantum infrared sensor configured to detect light in an infrared region;

a signal processor electrically connected to the quantum infrared sensor;

a thermal conductor in contact with the signal processor and disposed at a different position than the quantum infrared sensor in plan view;

a seal configured to seal the quantum infrared sensor, the signal processor, and the thermal conductor integrally, and an optical member disposed in contact with the portion of the thermal conductor exposed from the seal, wherein a light-receiving surface of the quantum infrared sensor and a portion of the thermal conductor are exposed from the seal, and the thermal conductor is configured by a material with higher thermal conductivity than resin.

2. The infrared sensor module according to claim 1, wherein the optical member is a field of view limiting portion that limits a field of view of the light-receiving surface.

3. The infrared sensor module according to claim 1, wherein the signal processor and the thermal conductor have a thermal expansion coefficient of $2\times10^{-6}$/K to $10\times10^{-6}$/K.

4. The infrared sensor module according to claim 1, wherein the quantum infrared sensor and the thermal conductor are disposed above a main surface of the signal processor.

5. The infrared sensor module according to claim 1, wherein the light-receiving surface of the quantum infrared sensor and the portion of the thermal conductor are exposed from an identical surface of the seal.

6. An infrared sensor module comprising:

a quantum infrared sensor configured to detect light in an infrared region;

a signal processor electrically connected to the quantum infrared sensor;

a thermal conductor in contact with the signal processor and disposed at a different position than the quantum infrared sensor in plan view; and a seal configured to seal the quantum infrared sensor, the signal processor, and the thermal conductor integrally, wherein a light-receiving surface of the quantum infrared sensor and a portion of the thermal conductor are exposed from the seal, and the thermal conductor is configured by a material with higher thermal conductivity than resin, wherein the signal processor and the thermal conductor have a thermal expansion coefficient of $2\times10^{-6}$/K to $10\times10^{-6}$/K.

7. The infrared sensor module according to claim 6, wherein the quantum infrared sensor and the thermal conductor are disposed above a main surface of the signal processor.

8. The infrared sensor module according to claim 6, wherein the light-receiving surface of the quantum infrared sensor and the portion of the thermal conductor are exposed from an identical surface of the seal.

* * * * *